US010419233B2

(12) United States Patent
Bontu et al.

(10) Patent No.: US 10,419,233 B2
(45) Date of Patent: Sep. 17, 2019

(54) METHOD AND APPARATUS FOR MULTIMEDIA BROADCAST MULTICAST SERVICE TRANSMISSION

(71) Applicant: Telefonaktiebolaget LM Ericsson (publ), Stockholm (SE)

(72) Inventors: Chandra Sekhar Bontu, Nepean (CA); Prabaharan Kanesalingam, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 15/526,102

(22) PCT Filed: Nov. 21, 2014

(86) PCT No.: PCT/IB2014/066253
§ 371 (c)(1),
(2) Date: May 11, 2017

(87) PCT Pub. No.: WO2016/079573
PCT Pub. Date: May 26, 2016

(65) Prior Publication Data
US 2017/0324571 A1 Nov. 9, 2017

(51) Int. Cl.
*H04L 12/18* (2006.01)
*H04W 76/27* (2018.01)
(Continued)

(52) U.S. Cl.
CPC .............. *H04L 12/189* (2013.01); *H04L 1/00* (2013.01); *H04L 1/0003* (2013.01);
(Continued)

(58) Field of Classification Search
CPC ... H04L 1/0002; H04L 1/0003; H04L 1/0009; H04L 1/0026; H04L 12/189;
(Continued)

(56) References Cited

U.S. PATENT DOCUMENTS

| 8,175,069 B2 * | 5/2012 | Wang | H04W 72/005 370/342 |
| 8,340,002 B2 * | 12/2012 | Johansson | H04L 12/1863 370/235 |

(Continued)

FOREIGN PATENT DOCUMENTS

WO    2008095523 A1    8/2008

OTHER PUBLICATIONS

Qualcomm Incorporated, Discussion of MBSFN Measurements, Oct. 11, 2013, 3GPP, 3GPP TSG-RAN WG1 #74bis, Tdoc: R1-134614 (Year: 2013).*

(Continued)

*Primary Examiner* — Eric Nowlin
(74) *Attorney, Agent, or Firm* — Sage Patent Group

(57) ABSTRACT

The present disclosure relates to a Multimedia Broadcast Multicast Service (MBMS), and in particular to a method, system and network entity for configuring transmission parameters for providing MBMS service(s). In one embodiment, a network entity in communication with a plurality of network nodes within a geographical area is provided. The network entity includes a communication interface configured to receive a representation of signal quality measurement data associated with a plurality of non-Multimedia Broadcast Multicast Service, non-MBMS, user equipments, UEs. Each UE is served by at least one of the plurality network nodes. The network entity includes a processor communicatively coupled to the communication interface. The processor is configured to determine a combined signal quality data of a plurality of MBMS UEs based at least in part on the received representation of signal quality measurement data associated with the plurality of non-MBMS UEs.

42 Claims, 11 Drawing Sheets

(51) Int. Cl.
*H04L 1/00* (2006.01)
*H04W 72/00* (2009.01)
*H04W 88/02* (2009.01)

(52) U.S. Cl.
CPC .......... *H04L 1/0009* (2013.01); *H04L 1/0026* (2013.01); *H04W 72/005* (2013.01); *H04W 76/27* (2018.02); *H04L 2001/0093* (2013.01); *H04W 88/02* (2013.01)

(58) Field of Classification Search
CPC ........... H04L 49/201; H04L 2001/0093; H04L 1/1854; H04L 12/1868; H04L 12/1877; H04W 4/06; H04W 72/005; H04W 72/121; H04W 72/1226; H04W 72/1231; H04W 72/1252; H04W 76/27; H04W 76/40; H04W 88/02; H04W 24/10; H04W 36/30; H04W 72/085; H04B 7/0619; H04B 17/24; H04B 17/309; H04B 17/318
See application file for complete search history.

(56) References Cited

U.S. PATENT DOCUMENTS

| | | | |
|---|---|---|---|
| 8,422,474 B2* | 4/2013 | Park | H04B 7/0452 370/338 |
| 8,483,742 B2* | 7/2013 | Kim | H04W 52/12 370/252 |
| 8,644,207 B1 | 2/2014 | Vivanco et al. | |
| 8,654,881 B2* | 2/2014 | Oh | H04L 1/0083 375/267 |
| 8,665,770 B2 | 3/2014 | Koo et al. | |
| 8,699,398 B2 | 4/2014 | Newberg et al. | |
| 8,811,211 B2* | 8/2014 | Huschke | H04L 1/0002 370/252 |
| 8,842,558 B2* | 9/2014 | Wang | H04L 1/0026 370/252 |
| 8,937,868 B2* | 1/2015 | Kim | H04L 1/0003 370/239 |
| 9,036,484 B2* | 5/2015 | Sun | H04W 24/10 370/241 |
| 9,071,315 B2* | 6/2015 | Huang | H04B 1/1027 |
| 9,088,908 B2* | 7/2015 | Liu | H04W 28/065 |
| 9,172,447 B2* | 10/2015 | Park | H04B 7/0452 |
| 9,277,437 B2* | 3/2016 | Wu | H04W 4/06 |
| 9,531,558 B2* | 12/2016 | Wu | H04W 4/06 |
| 9,544,805 B2* | 1/2017 | Koskinen | H04W 4/06 |
| 9,634,746 B2* | 4/2017 | Park | H04B 7/0452 |
| 9,642,117 B2* | 5/2017 | Zhao | H04W 48/00 |
| 9,667,363 B2* | 5/2017 | Wang | H04B 17/318 |
| 9,807,662 B2* | 10/2017 | Wang | H04W 36/0083 |
| 9,814,019 B2* | 11/2017 | Kazmi | H04L 5/0044 |
| 9,900,067 B2* | 2/2018 | Oh | H04L 1/0083 |
| 9,949,162 B2* | 4/2018 | Koskinen | H04W 4/06 |
| 9,955,489 B2* | 4/2018 | Jwa | H04W 72/085 |
| 10,015,641 B2* | 7/2018 | Kim | H04W 4/06 |
| 10,015,687 B2* | 7/2018 | Van Lieshout | H04W 24/08 |
| 10,020,902 B2* | 7/2018 | Kim | H04W 24/10 |
| 10,257,664 B2* | 4/2019 | Kim | H04W 24/10 |
| 10,292,018 B2* | 5/2019 | Jung | H04W 4/06 |
| 2008/0267109 A1* | 10/2008 | Wang | H04W 72/005 370/312 |
| 2011/0098076 A1* | 4/2011 | Kim | H04W 52/12 455/522 |
| 2011/0249607 A1* | 10/2011 | Ishikura | H04H 20/57 370/312 |
| 2012/0188894 A1* | 7/2012 | Huschke | H04L 1/0002 370/252 |
| 2012/0195221 A1* | 8/2012 | Wang | H04W 72/005 370/252 |
| 2013/0310048 A1* | 11/2013 | Hunukumbure | H04W 52/0206 455/443 |
| 2014/0003479 A1* | 1/2014 | Huang | H04B 1/1027 375/224 |
| 2014/0031038 A1* | 1/2014 | Wang | H04W 36/0083 455/436 |
| 2014/0086293 A1* | 3/2014 | Koike | H04B 17/327 375/224 |
| 2014/0341104 A1* | 11/2014 | Zhao | H04W 48/00 370/312 |
| 2015/0055539 A1* | 2/2015 | Koskinen | H04W 4/06 370/312 |
| 2015/0201344 A1* | 7/2015 | Wu | H04W 4/06 370/252 |
| 2015/0223090 A1* | 8/2015 | Van Lieshout | H04W 24/08 370/252 |
| 2016/0119158 A1* | 4/2016 | Wu | H04W 4/06 370/312 |
| 2016/0212595 A1* | 7/2016 | Fukuta | H04W 4/06 |
| 2016/0261394 A1* | 9/2016 | Kazmi | H04L 5/0044 |
| 2016/0337818 A1* | 11/2016 | Keskitalo | H04W 4/06 |
| 2016/0337930 A1* | 11/2016 | Agarwal | H04W 36/32 |
| 2016/0344489 A1* | 11/2016 | Kim | H04W 24/10 |
| 2016/0360538 A1* | 12/2016 | Jwa | H04W 72/085 |
| 2017/0006485 A1* | 1/2017 | Dalsgaard | H04W 4/06 |
| 2017/0019772 A1* | 1/2017 | Kim | H04W 4/06 |
| 2017/0055171 A1* | 2/2017 | Keskitalo | H04W 24/10 |
| 2017/0055173 A1* | 2/2017 | Koskinen | H04W 4/06 |
| 2017/0064518 A1* | 3/2017 | Kim | H04W 24/10 |
| 2017/0104549 A1* | 4/2017 | Wang | H04B 17/318 |
| 2017/0111424 A1* | 4/2017 | Long | H04L 29/06 |
| 2017/0195906 A1* | 7/2017 | Dalsgaard | H04W 24/10 |
| 2017/0251456 A1* | 8/2017 | Radulescu | H04B 17/318 |
| 2017/0288888 A1* | 10/2017 | Rico Alvarino | H04W 4/90 |
| 2017/0324571 A1* | 11/2017 | Bontu | H04L 1/00 |
| 2018/0205483 A1* | 7/2018 | Nagaraja | H04B 17/309 |
| 2018/0213366 A1* | 7/2018 | Seo | H04L 1/00 |
| 2018/0213386 A1* | 7/2018 | Kim | H04J 11/0073 |
| 2018/0227779 A9* | 8/2018 | Dalsgaard | H04W 4/06 |
| 2018/0288640 A1* | 10/2018 | Van Lieshout | H04W 24/08 |
| 2018/0288659 A1* | 10/2018 | Jamadagni | H04W 4/06 |
| 2018/0317066 A1* | 11/2018 | Xu | H04W 4/06 |
| 2018/0352454 A1* | 12/2018 | Trank | H04W 4/06 |
| 2019/0058532 A1* | 2/2019 | Nagaraja | H04B 17/24 |

OTHER PUBLICATIONS

Qualcomm Incorporated, Initial MBSFN Measurement Evaluation, Oct. 11, 2013, 3GPP, 3GPP TSG-RAN WG1 #74bis, Tdoc: R1-134615 (Year: 2013).*

International Search Report and Written Opinion dated Jul. 29, 2015 for International Application Serial No. PCT/IB2014/066253, International Filing Date—Nov. 21, 2014 consisting of 13-pages.

3GPP TSG-RAN WG1 #75, San Francisco, CA (USA) R1-135207, Agenda Item: 6.2.5, Source: Samsung Title: "Discussion on Measurements for Further MBMS Operations Support" Document for: Discussion and Decision Nov. 11-15, 2013 consisting of pp. 4-pages.

* cited by examiner

METHOD AND APPARATUS FOR MULTIMEDIA BROADCAST MULTICAST SERVICE TRANSMISSION

CROSS-REFERENCE TO RELATED APPLICATION

This application is a Submission Under 35 U.S.C. § 371 for U.S. National Stage Patent Application of International Application Number: PCT/IB2014/066253, filed Nov. 21, 2014 entitled "METHOD AND APPARATUS FOR MULTIMEDIA BROADCAST MULTICAST SERVICE TRANSMISSION," the entirety of which is incorporated herein by reference.

FIELD

The present disclosure relates to Multimedia Broadcast Multicast Services (MBMS), and in particular to a method, system and network entity for configuring transmission parameters for providing MBMS service(s).

BACKGROUND

With the increased demand for mobile wireless services, network operators are exploring cost efficient ways to introduce new network services along with existing cellular services on the same carrier frequency. One such service is Multimedia Broadcast Multicast Service (MBMS). MBMS provides point to multipoint communication where packets are transmitted from a single source to multiple destinations such as MBMS user equipments (UEs) belonging to a multicast group.

In one implementation, MBMS is deployed within a Long Term Evolution (LTE) based network through the LTE Orthogonal Frequency Division Multiplexing (OFDM) air interface. As specified in LTE communication standards, a set of subframes of a carrier frequency can be assigned for the MBMS services. In the MBMS transmission mode, the broadcast/multicast data is synchronously transmitted by multiple cell sites within a geographical area on the same set of subframes of a carrier frequency and the geographical area is termed as a Multicast Broadcast Single Frequency Network (MBSFN). As used herein, a "cell" is a land area served by at least one radio unit, known as a "cell site". Furthermore, a "network node", a "base station" (BS) and "evolved Node-Bs" (eNB) are understood to be the same. Even further, a network node, BS or eNB are understood as possibly supporting multiple cell sites to provide coverage within multiple cells, by providing a common interface to all the supported cell sites' equipment to the evolved packet core network. A "network entity" refers herein to one or more physical entities connected to a cell site via the common interface provided by the cell-site's eNB. A network entity can be separate from an eNB, an eNB or distributed among several physical entities. A "serving cell site" is a cell site with which a UE has established a radio resource control (RRC) connection and that is actively listening to the DL system broadcast. Further, multiple cell sites may be supported by an evolved Node-B (eNB) or Base Station (BS). In particular, an eNB or BS act as the General Packet Radio Service (GPRS) tunnel point (GTP) end point for data and control paths associated with all the UEs actively communicating with any of the cell sites that belong to the eNB/BS from the evolved packet core (EPC).

Subframes for MBMS services, i.e., MBSFN subframes, are semistatically configured by the network based on the type of broadcast/multicast service and the associated Quality of Service (QoS) requirements. The MBMS UEs which are interested (and subscribed) to broadcast/multicast services listen to assigned MBSFN subframes. MBSFN reference signals are also transmitted as part of the assigned MBSFN subframes by all the cell sites within the MBSFN area in which the reference signals are generated based on the MBSFN area identity ($N_{ID}^{MBSFN}$). The data symbols containing the broadcast or multicast content are transmitted using a modulation and coding scheme (MCS) value specified in a System Information Block 13 (SIB13) message.

The MCS and number of MBSFN subframes used for transmitting the MBMS content within an MBSFN area are determined in order to satisfy the QoS requirement for the specific service(s) for all the UEs actively listening to the service(s). When an MCS with higher spectral efficiency, i.e., more number of bits per modulation symbol, can reliably deliver transmitted content to all the UEs actively listening within the MBSFN area, fewer subframes need to be assigned for MBMS service. The rest of the subframes of the carrier frequency can be used for unicast cellular traffic, thus increasing the overall spectral efficiency. The MCS for a MBMS service is dependent on the lowest signal to interference plus noise ratio (SINR) experience by the UEs within the MBSFN area. A network entity which has information about the minimum Signal-to-Interference Noise Ratio (SINR) within a MBSFN area can decide the MCS for the MBMS transmission.

MBMS UEs receive content from cell sites that are using the same transmission parameters. The number of cell sites transmitting broadcast or multicast content is transparent to MBMS UEs.

If a UE receives the same signal from N cell sites, the received resource element (RE) at the UE-m, $R_{kl}$, can be expressed as follows:

$$R_{kl} = \sum_{i=0}^{N-1} \sqrt{\rho_{i \to m}^{M}} H_{kl}(i \to m) S_{kl} + N_{kl} \quad \text{(Eq. 1)}$$

where $\rho_{i \to m}^{M}$ is the average received power at the UE-m from cell site-i for MBMS transmission, $H_{kl}(i \to m)$ is the channel weight on kth subcarrier of lth OFDM symbol, $H_{kl}(i \to m)$ can be represented as a zero-mean complex Gaussian variable with the following property:

$$\sum_{k=0}^{N_{RB}^{DL} N_{sc}^{RB}-1} |H_{kl}(i \to m)|^2 = 1,$$

$N_{RB}^{DL}$ and $N_{sc}^{RB}$ are the number of resource blocks (RBs) in the downlink (DL) and the number of subcarriers per RB respectively, $R_{kl}$ is the received RE at the kth subcarrier of the lth OFDM symbol. $S_{kl}$ is the transmitted symbol on the kth subcarrier of the lth OFDM symbol and $N_{kl}$ represents the thermal noise observed on the kth subcarrier of the lth OFDM symbol and any unwanted interference.

As mentioned above, the multi-cell synchronous transmission is transparent to the MBMS-UE, in part, because the reference symbols transmitted by the cell sites are the same, such that the UEs cannot distinguish the transmission from different cell sites. Therefore, the above equation can be re-written as follows:

$$R_{kl} = \tilde{H}_{kl}(i \to m) S_{kl} + N_{kl} \quad \text{(Eq. 2)}$$

$$\tilde{H}_{kl}(i \to m) = \sum_{i=0}^{N-1} \sqrt{\rho_{i \to m}^{M}} H_{kl}(i \to m) \quad \text{(Eq. 3)}$$

The signal received at the MBMS-UE-m experiences the composite channel effects represented by $\tilde{H}_{kl}(i \to m)$. As illustrated in FIG. 1, the received power from each cell site can be represented as follows:

$$\rho_{i \to m}^M = \frac{P_i^M}{L_{i \to m}} \quad \text{(Eq. 4)}$$

where $P_i^M$ is the average transmit power level at cell site-i over the MBSFN transmissions and $L_{i \to m}$ represents the path-loss from cell site-i to UE-m.

The relationship of ρ to the reference signal received (RSRP) measurements by a non-MBMS UE is described next. As used herein, a non-MBMS UE is a UE which is not actively listening to MBMS services. Non-MBMS UEs that are connected to cell sites for unicast services measure the downlink (DL) signal quality over the transmitted cell site specific reference signals (which are transmitted as part of the normal subframes and these references signals are different from the MBSFN reference signals), and report the measurement back to their respective serving cell site. The channel quality may, for example, be measured as a Reference Signal Receive Power (RSRP) or a Reference Signal Receive Quality (RSRQ). The RSRP can be measured over the reference signal transmitted on antenna port-0 (and, optionally, also over antenna port 1) by the serving cell site and the one or more neighboring cell sites. The reporting mechanism of the non-MBMS UEs may be triggered by the serving cell site. The RSRP is measured over OFDM symbols with Reference Symbol Resource Element (RSRE) and is the linear average over the power contribution of the resource elements that consist of cell site specific reference signals (CRS) within the considered measurement frequency bandwidth (UE implementation). RSRP can be determined over CRS port-0. If the UE can reliably detect that CRS port-1 is available, it may use CRS on port-1 in addition to CRS on port-0 to determine the RSRP. RSRP measurements that are measured at a non-MBMS UE-u, can be expressed mathematically as follows:

$$RSRP(i \to u) = P_i E\left[\sum_{k=0}^{N_{RB}^{DL} N_{sc}^{RB}-1} |H_{ki}(i \to u)|^2\right] = \rho_{i \to u} \text{█████} \quad \text{or}$$

$$i = 0, 1, \ldots, N-1$$

where E[ ] is the expectation operator. In the above equation, E[ ] indicates the averaging over the OFDM symbols, i.e., l. $\rho_{i \to u}$ represents the RSRP measured with respect to cell site-i of non-MBMS UE-u. In one embodiment, the RSRP measurements are included in the channel quality measurement reports received at the serving cell site.

Since there is no RSRP or other channel quality measurement feedback from MBMS UEs, existing MBMS solutions rely on extensive drive tests to guarantee reception throughout the MBSFN area. These drive test involve physically driving across the coverage area where the MBMS services will be provided, and measuring the signal quality at various locations using specialized test equipment. The measurements are stored and later evaluated to determine which MCS is best for meeting a promised Quality of Service (QoS) for a MBMS service within the coverage area. While these extensive drive tests may provide a method for configuring MBSFN areas and subsequent assignment of the MCS, these drive test based configurations are very time consuming and very expensive due to the fact that technicians have to physically drive around the coverage area to take measurements. Further, each reconfiguration of the MBSFN area and assigned MCS may disadvantageously require respective drive tests.

SUMMARY

The present disclosure advantageously provides a method, system and network entity for configuring transmission parameters for providing MBMS service(s). The system may include one or more network nodes that provide one or more wireless coverage cells for user equipments. In certain embodiments, the network node may be a basestation (BS) or eNodeB (eNB).

According to one embodiment of the disclosure, a network entity in communication with a plurality of network nodes within a geographical area is provided. The network entity includes a communication interface configured to receive a representation of signal quality measurement data associated with a plurality of non-Multimedia Broadcast Multicast Service, non-MBMS, user equipments. UEs. Each UE is served by at least one of the plurality network nodes. The network entity includes a processor communicatively coupled to the communication interface. The processor is configured to determine a combined signal quality data of a plurality of MBMS UEs based at least in part on the received representation of signal quality measurement data associated with the plurality of non-MBMS UEs.

According to one aspect of this embodiment, the processor is further configured to determine a Modulation and Coding Scheme, MCS, for providing an MBMS service based on the combined signal quality data associated with the plurality of non-MBMS UE. According to another aspect of this embodiment, the processor is further configured to cause the communication interface to transmit the determined MCS to at least one network node for implementation by the at least one network node to provide the MBMS service. According to another aspect of this embodiment, the processor is further configured to determine a required radio resource for MBMS service based on the determined MCS. According to another aspect of this embodiment, the determined required radio resource and MCS being configured to satisfy a Quality of Service, QoS, requirement for an MBMS service.

According to another aspect of this embodiment, a determination of the combined signal quality data includes estimating a downlink Channel Quality Indicator, CQI, of the at least one MBMS UE based at least in part on the received representation of signal quality measurement data associated with the plurality of non-MBMS UEs. According to still another aspect of this embodiment, the processor is further configured to cause the communication interface to send a trigger to the plurality of non-MBMS UEs to report the representation of signal quality measurement data to the communication interface. According to yet another aspect of this embodiment, the processor is further configured to select non-MBMS UEs that are to receive the trigger based at least in part on a location of the respective non-MBMS UEs within the geographical area.

According to another aspect of this embodiment, the processor is further configured to cause the communication interface to transmit a message to at least one of the plurality of network nodes, the message configured to cause the at least one of the plurality of network nodes to send a trigger to at least one non-MBMS UEs associated with the at least one of the plurality of network nodes to report the representation of signal quality measurement data. According to another aspect of this embodiment, the trigger is a Radio Resource Control Connection Reconfiguration message. According to another aspect of this embodiment, the representation of signal quality measurement data consists of received signal qualities with respect to a serving cell site and at least one neighbor cell site from the plurality of network nodes.

According to another aspect of this embodiment, the processor is further configured to determine at least one Multicast Broadcast Single Frequency Network, MBSFN, coverage area for providing an MBMS service based at least in part on the received representation of signal quality measurement data associated with the plurality of non-MBMS UEs. According to another aspect of this embodiment, a determination of the MBSFN area for MBMS service provides a reduction of the required radio resources to satisfy a predefined QoS requirement for the MBMS service. According to another aspect of this embodiment, the processor is further configured to determine a plurality of reserved cell sites of the MBSFN area. According to another aspect of this embodiment, the determination of the reserved cell sites is based on an interference level experience by the MBMS UEs within the MBSFN area.

According to another aspect of this embodiment, the determination of the reserved cell sites is based on the number of radio resources muted in the reserved cell sites. According to another aspect of this embodiment, the processor is further configured to determine a Modulation and Coding Scheme, MCS, for providing the MBMS service, in part, by generating an average signal quality metric of at least one MBMS UE based at least in part on the received representation of signal quality measurement data associated with the plurality of non-MBMS UEs. According to another aspect of this embodiment, the processor is further configured to determine a Modulation and Coding Scheme, MCS, for providing the MBMS service, in part, by mapping the generated average signal quality metric of the at least one MBMS UE to a predetermined physical layer performance value to determine the MCS for providing the MBMS service, and selecting an MCS from the determined MCS values which provides MBMS service with acceptable QoS to all the MBMS UEs within the MBSFN area.

According to another aspect of this embodiment, the generating of an average signal quality metric includes considering a combined signal quality data of the received representation of signal quality measurement data from the plurality of network nodes within the geographical area as a useful signal, and considering a combined signal quality data of the received representation of signal quality measurement data from the plurality of network nodes outside the geographical area as a interfering signal. According to another aspect of this embodiment, the average signal quality metric is one of a signal-to-interference plus noise ratio, SINR, metric and interference level metric. According to another aspect of this embodiment, the selecting of the MCS from the determined MCS values includes selecting the MCS corresponding to the lowest average signal quality metric from all the compound average signal quality metric from the measurement reports received from the network nodes within the MBSFN area. According to another aspect of this embodiment, the network entity is one of an MBMS Coordination Entity, MCE, an Operation, Administration and Maintenance, OAM, entity and a network node. According to another aspect of this embodiment, the network entity is distributed over several physical entities.

According to another embodiment of the disclosure, a method for determining combined signal quality data is provided. A representation of signal quality measurement data associated with a plurality of non-Multimedia Broadcast Multicast Service, non-MBMS, user equipments, UEs is received at a network entity. Each UE is served by at least one of a plurality network nodes. A combined signal quality data is determined based at least in part on the received representation of signal quality measurement data associated with the plurality of non-MBMS UEs.

According to another aspect of this embodiment, a Modulation and Coding Scheme, MCS, for providing an MBMS service is determined based on the combined signal quality data associate with the plurality of non-MBMS UEs. According to another aspect of this embodiment, the determined MCS is transmitted to at least one network node for implementation by the at least one network node to provide the MBMS service. According to another aspect of this embodiment, a required radio resource for MBMS service is determined based on the determined MCS. According to still another aspect of this embodiment, the determined required radio resource and MCS are configured to satisfy a Quality of Service, QoS, requirement for an MBMS service. According to another aspect of this embodiment, a determination of the combined signal quality data includes estimating a downlink Channel Quality Indicator, CQI, of at least one MBMS UE based at least in part on the received representation of signal quality measurement data associated with the plurality of non-MBMS UEs.

According to another aspect of this embodiment, a trigger is sent to the plurality of non-MBMS UEs to report the representation of signal quality measurement data. According to another aspect of this embodiment, non-MBMS UEs that are to receive the trigger are selected based at least in part on a location of the respective non-MBMS UEs within the geographical area. According to another aspect of this embodiment, a message is transmitted to at least one of the plurality of network nodes. The message is configured to cause the at least one of the plurality of network nodes to send a trigger to at least one non-MBMS UEs associated with the at least one of the plurality of network nodes to report the representation of signal quality measurement data. According to another aspect of this embodiment, the trigger is a Radio Resource Control Connection Reconfiguration message.

According to another aspect of this embodiment, the representation of signal quality measurement data consists of received signal qualities with respect to a serving cell site and at least one neighbor cell site from the plurality of network nodes. According to another aspect of this embodiment, at least one Multicast Broadcast Single Frequency Network, MBSFN, coverage area for providing an MBMS service is determined based at least in part on the received representation of signal quality measurement data associated with the plurality of non-MBMS UEs. According to another aspect of this embodiment, a determination of the MBSFN area for MBMS service provides a reduction of the required radio resources to satisfy a predefined QoS requirement for the MBMS service.

According to another aspect of this embodiment, a plurality of reserved cell sites of the MBSFN area are determined. According to another aspect of this embodiment, the determination of the reserved cell sites is based on the interference level experienced by the MBMS UEs within the MBSFN area. According to another aspect of this embodiment, the determination of the reserved cell sites is based on the number radio resources muted in the reserved cell sites. According to another aspect of this embodiment, a Modulation and Coding Scheme. MCS, for providing the MBMS service is determined, in part, by generating an average signal quality metric of at least one MBMS UE based at least in part on the received representation of signal quality measurement data associated with the plurality of non-MBMS UEs. According to another aspect of this embodiment, a Modulation and Coding Scheme, MCS, for providing the MBMS service is determined, in part, by mapping the generated average signal quality metric of the at least one MBMS UE to a predetermined physical layer performance value to determine the MCS for providing the MBMS service, and selecting an MCS from the determined MCS values which provides MBMS service with acceptable QoS to all the MBMS UEs within the MBSFN area.

According to another aspect of this embodiment, generating an average signal quality metric includes considering a combined signal quality data of the received representation of signal quality measurement data from the plurality of network nodes within the geographical area as a useful signal, and considering a combined signal quality data of the received representation of signal quality measurement data from the plurality of network nodes outside the geographical area as a interfering signal. According to another aspect of this embodiment, the average signal quality metric is one of a signal-to-interference plus noise ratio, SINR, metric and interference level metric. According to another aspect of this embodiment, the selecting of the MCS from the determined MCS values includes selecting the MCS corresponding to the lowest average signal quality metric from all the computed average signal quality metric from the measurement reports received from the network nodes within the MBSFN area. According to another aspect of this embodiment, the network entity is one of an MBMS Coordination Entity, MCE, an Operation, Administration and Maintenance, OAM, entity and a network node. According to another aspect of this embodiment, the network entity is distributed over several physical entities.

According to another embodiment of the disclosure, a network entity in communication with a plurality of network nodes within a geographical area is provided. The network entity includes a communication module configured to receive a representation of signal quality measurement data associated with a plurality of non-Multimedia Broadcast Multicast Service, non-MBMS, user equipments, UEs. Each UE is served by at least one of the plurality network nodes. The network entity includes a processor module communicatively coupled to the communication interface. The processor module is configured to determine a combined signal quality data of a plurality of MBMS UEs based at least in part on the received representation of signal quality measurement data associated with the plurality of non-MBMS UEs.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
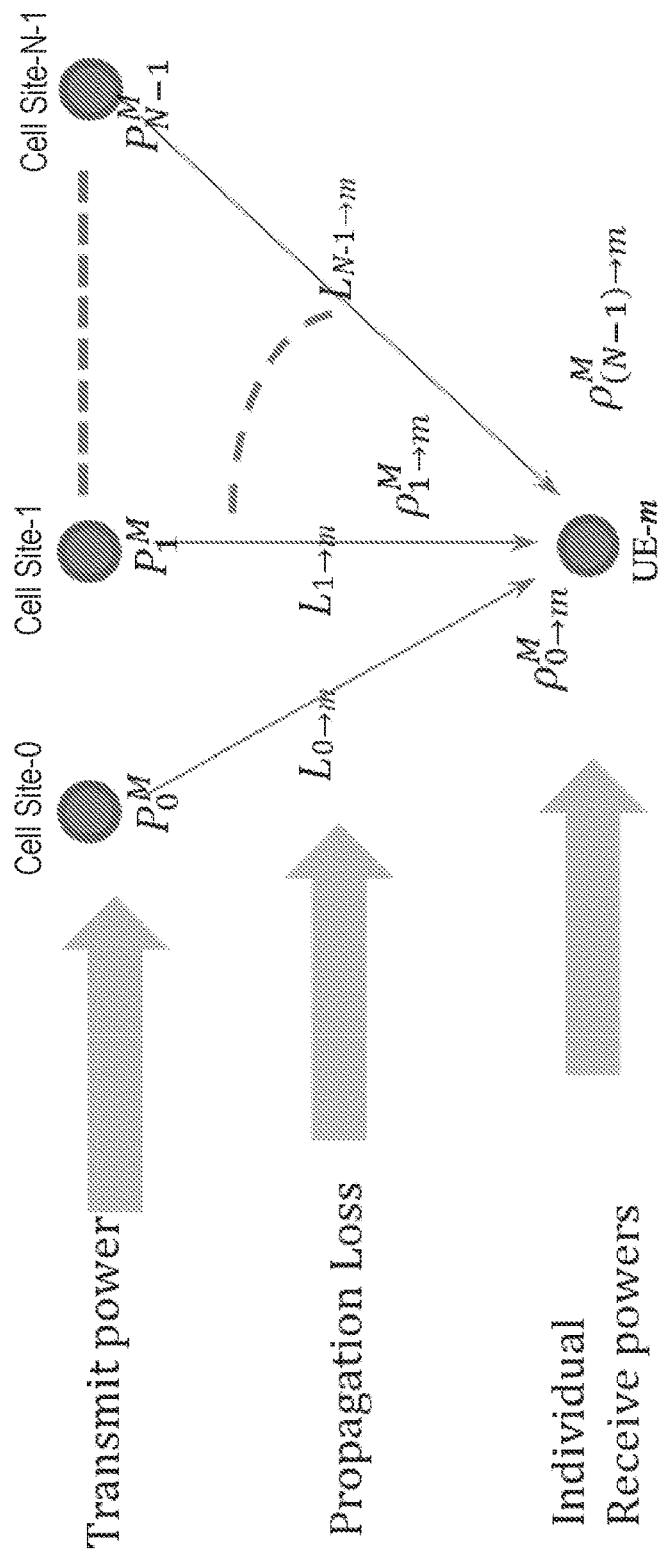
FIG. 1 is a diagram of a known multi-cell MBMS transmission arrangement.

The system, network entity and methods according to some embodiments described herein provide for determining transmission parameters for providing MBMS service(s) in an MBSFN area. In one embodiment, a Modulation and Coding Scheme (MCS) for MBMS services is determined using signal quality measurement data from non-MBMS UEs, thereby providing a solution to the problem of configuring MBMS service(s) for MBMS UEs when the MBMS UEs do not provide channel quality measurement feedback.

From the RSRP reports described with respect to Eq. 5, e.g., channel quality measurement data, from various non-MBMS UEs, the average SINR at the uth non-MBMS UE can be estimated as follows:

$$\bar{\gamma}_u = \frac{\rho_{0 \to u}}{\sum_{i=1}^{L-1} \rho_{i \to u} + N_{0u}} \quad \text{(Eq. 6)}$$

where $\rho_{0 \to u}$ represents the RSRP measured with respect to serving cell site of non-MBMS UEs. It is assumed that there are L-1 neighbor cell sites or eNBs.

For MBMS UEs, where synchronous transmissions from multiple cell sites are received, the above equation (Eq. 6) is not valid. Assuming N cell sites (N<L) are simultaneously transmitting the MBMS content, the above equation is modified for mth MBMS UEs as follows:

$$\bar{\gamma}_m = \frac{\sum_{i=0}^{N-1} \rho_{i \to m}^M}{\sum_{i=N}^{L-1} \rho_{i \to m}^M + N_{0m}} \quad \text{(Eq. 7)}$$

The received power at an MBMS UE is modified as $\rho_{i \to m}^M$.

There are two problems with computing the SINR at MBMS UE as indicated in the above equation (Eq. 7), thereby hindering subsequent Modulation and Coding Scheme (MCS) determination. One is that the above equation (Eq. 7) assumes that the transmissions from various cell sites are coherently combined to obtain diversity gain. The second is that there is no RSRP measurement feedback from an MBMS UE. Further, in MBMS transmission, all the cell sites within a MBSFN use the same MCS. These two problems are addressed in embodiments according to the present disclosure as detailed later on.

According to further embodiments described herein, systems, network entities and methods for configuration of MBSFN area(s) using signal quality measurement data from non-MBMS UEs are provided. The instant disclosure advantageously uses channel quality measurement feedback, i.e., signal quality measurement data, from non-MBMS UEs, in a geographical area to determine one or more configurations for providing MBMS services. According to some embodiments, the connected non-MBMS UEs, i.e., unicast UEs, are instructed to report the downlink measurement report by receipt of RRC connection reconfiguration messages.

The accuracy of the MCS estimation can be increased by collecting more measurement data. According to further embodiments, the overall system throughput is optimized, i.e., both MBMS and unicast traffic capacity. In yet further embodiments, the MCS used for the MBMS traffic is re-optimized based on the interference from the surrounding cell sites, i.e., system load of the unicast traffic and another multicast traffic in the surrounding cells. In one embodiment, the configuring of the MCS for an MBSFN is automated such that the configuration can be changed without the need for special procedures such as drive tests. In another embodiment, MCS is changed based on the time of day, i.e., peak versus non-peak hours.

Before describing in detail exemplary embodiments that are in accordance with the disclosure, it is noted that the embodiments reside primarily in combinations of system components and processing steps related to determining MBMS transmission parameters for providing MBMS service(s). Accordingly, components have been represented where appropriate by conventional symbols in the drawings, shown only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication. Further, a network node as describe below may be a basestation (BS) or evolved Node B (eNodeB or eNB) that supports one or more wireless communication cell sites. Each wireless communication cell site is capable of supporting communications to/from one or more user equipments (UEs).

Figure 2:
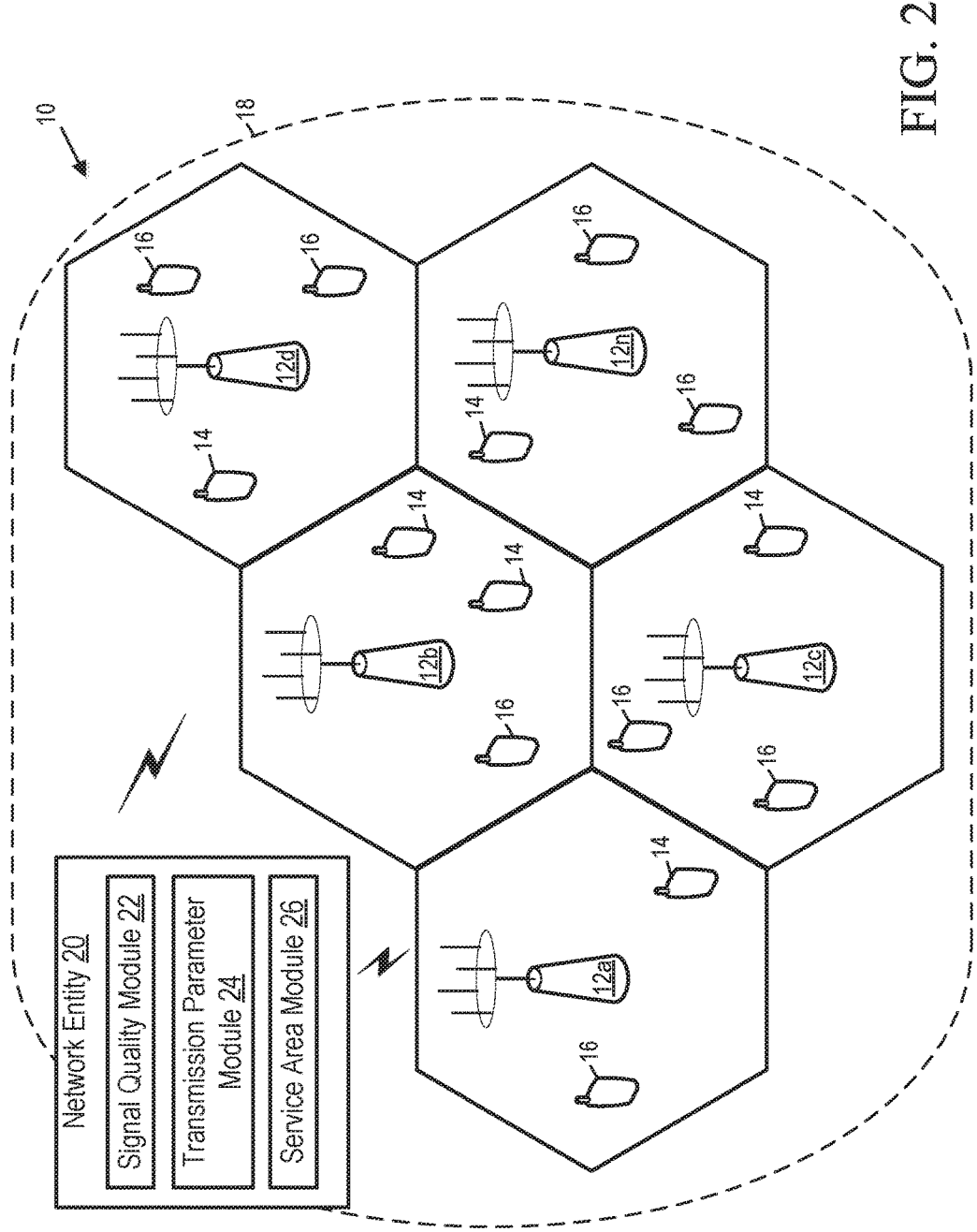
FIG. 2 is a block diagram of an exemplary system for configuring transmission parameters for providing MBMS service in accordance with the principles of the disclosure.

Referring now to figures in which like reference designators refer to like elements there is shown in FIG. 2 an exemplary system for determining transmission parameters for providing MBMS service(s) in accordance with the principles of the disclosure and designated generally as "10." For simplicity with respect to the description of FIG. 2, it is assumed that each network node consists of one cell site. System 10 includes one or more network nodes 12a-12n in communication with one or more MBMS UEs 14 that receive broadcast or multicast content and/or services. Network node 12 is also in communication with one or more non-MBMS UEs 16 that receive unicast content and/or services. Network node 12 may be a basestation or eNodeB (eNB) that provides one or more wireless communication cell sites. In one embodiment, UEs 14/16 with MBMS capability can operate simultaneously in unicast mode, multicast mode or both (on a shared channel allocation basis). The UEs can receive unicast/multicast data during the subframes allocated for the respective services. One or more network nodes 12 are positioned within geographical area 18. Geographical area 18 may correspond to one or more existent MBSFN areas. According to different embodiments, one or more of the MBSFN areas may be determined within geographical area 18.

System 10 includes one or more network entities 20 in communication with one or more network nodes 12 and UEs 14 and 16. Network entity 20 is configured to determine transmission parameters for providing MBMS service(s) in geographical area 18 in accordance with the disclosure. In one embodiment, network entity 20 is an eNB. In one embodiment, network entity 20 configures or determines MBSFN areas within the geographical area 18. In another embodiment, network entity 20 is an MBMS Coordination Entity (MCE) or an Operation, Administration and Maintenance (OAM) entity. The MCE is generally responsible for administration of radio resources for MBMS services. The OAM is generally responsible for managing network nodes 12. In one embodiment, the functionality of network entity 20, described herein, may be performed by one or more physical entities, or one or more network nodes 12 via multiple sub-processors and communication sub-interfaces as to provide a distributed network entity 20. Network entity 20 includes signal quality module 22, transmission parameter module 24 and service area module 26, among other modules, as will be described in detail below with respect to FIG. 3.

Figure 3:
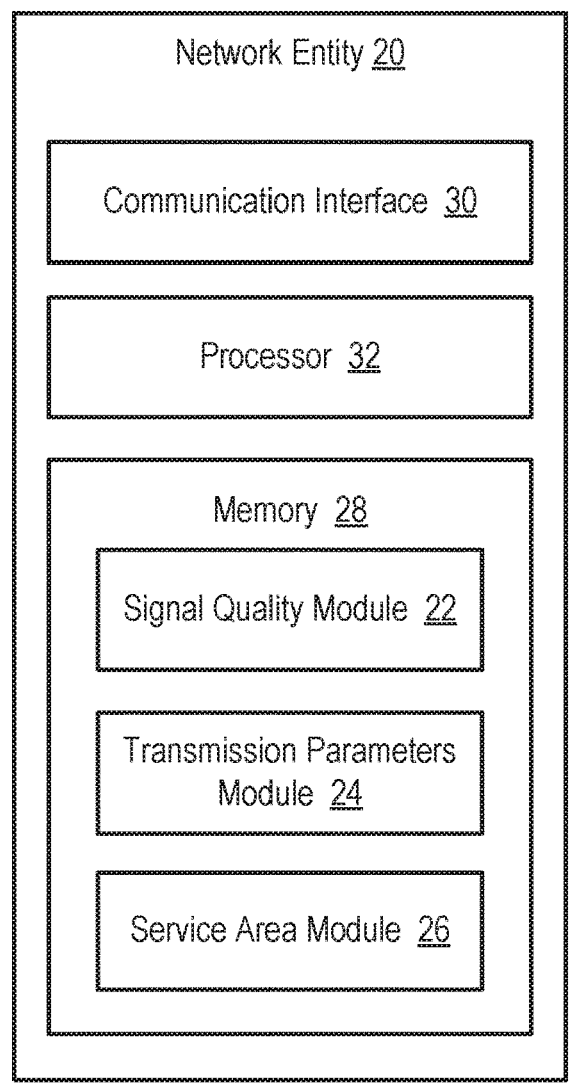
FIG. 3 is a block diagram of an exemplary network entity in accordance with the principles of the disclosure.

An exemplary network entity 20 for determining transmission parameters for providing MBMS service(s) in geographical area 18 is described with reference to FIG. 3.

Network entity 20 includes memory 28, one or more communication interfaces 30 and one or more processors 32 that are in communication with each other. Memory 28 stores program instructions for one or more modules and/or data. Memory 28 may include non-volatile and volatile memory. For example, non-volatile memory may include hard drive, solid state drive, flash memory, memory stick and the like. Also, volatile memory may include random access memory and others know in the art. Memory 28 may store program instructions such as those for a signal quality module 22. Optionally, memory 28 may further store program instructions for a transmission parameters module 24. Memory 28 may also store program instructions for a service area module 26. For example, signal quality module 22 includes instructions, which when executed by processor 32, causes processor 32 to perform the determination of combined signal quality measurement data of MBMS UEs 14, as discussed in detail with respect to FIG. 4. In another example, transmission parameters module 24 includes instructions, which when executed by processor 32, cause processor 32 to perform configuration of transmission parameters of one or more network nodes 12 for providing MBMS service(s), discussed in detail with respect to FIG. 5. In yet another example, service area module 26 includes instructions, which when executed by processor 32, causes processor 32 to perform configuration of one or more MBSFN areas for providing MBMS service(s), discussed in detail with respect to FIG. 6. While memory 28 of network entity 20 is illustrated having modules 22, 24 and 26, one or more of modules 22, 24 and 26 are optional and may be omitted from memory 28 based on design requirements.

Communication interface 30 is configured to communicate with elements of system 10 such as with one or more network nodes 12. UEs 14/16, other network entities 20 and other devices using Long Term Evolution (LTE) based protocols. Processor 32 is one or more central processing units (CPUs) or other processor for performing network entity 20 functions described herein.

Figure 4:
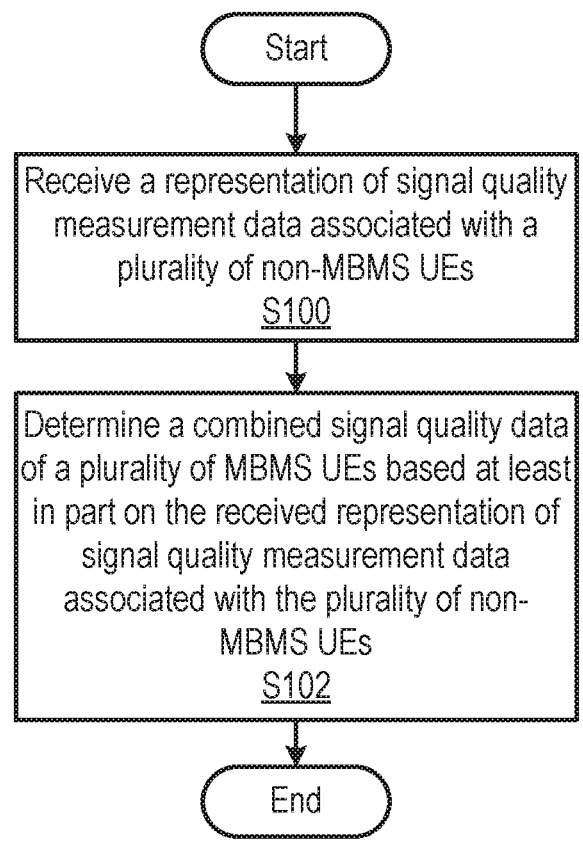
FIG. 4 is a signaling flow diagram of an exemplary process for determining combined signal quality data of MBMS UEs in accordance with the principles of the disclosure.

An exemplary process of signal quality module 22 for determining a combined signal quality data is discussed with reference to FIG. 4. Processor 32 determines that a representation of signal quality measurement data associated with a plurality of non-MBMS UEs 16 has been received (Block S100). The representation of signal quality measurement data corresponds to measurement data generated by non-MBMS UEs 16. In one embodiment, the representation of signal quality measurement data consists of received signal quality measurements with respect to a serving cell site 12 and at least one neighbor cell site 12 from the plurality of network nodes 12. The signal quality measurement data may be raw measurement data as generated by respective non-MBMS UEs 16. e.g., RSRP or RSRQ measurements, and may part of channel quality feedback reports. The measurement data in the representation of signal quality measurement data may be collected for a predefined duration. Representation in the context of the present disclosure may be a non-modified form of the original signal quality measurement data or a modified form of this data such as a compressed form, histogram or alternate/summarized form of data for reporting results of measurements.

The representation(s) of signal quality measurement data may be received from one or more devices, nodes, servers, etc. According to one embodiment of the disclosure, the received signal qualities from at least one non-MBMS UE 16 are received by at least one serving cell site 12. Subsequently, a representation of these collected receive signal qualities at the serving cell site's network node is forwarded to network entity 20 via communication interface 30. In this case, communication interface 30 can be an X2 interface as defined in 3GPP TS 36.423.

A representation of the signal qualities by serving cell site 12, may consist of, for example, the RSRP of the serving cell site and the RSRPs of the neighboring cell sites if the RSRP of the neighboring cell sites is within, for example, 6 dB of the RSRP of the serving cell site. Alternatively, for example, each serving cell site 12 can calculate the combined SINR for MBMS UEs 14 and the average SINRs or a histogram of these SINRs may be communicated to network entity 20. Alternatively, the lowest SINR is sent to network entity 20. Yet another alternative to send a histogram or the worst MCS value is sent to network entity 20. The MCS may then be determined based on the average SINR to the BLER rate tables. The specific tables which are used for this purpose may vary based on the QoS requirement and the mobility status of the UEs 14 which are expected to receive this content.

After Block 100 has been performed, processor 32 determines a combined signal quality data of a plurality of MBMS UEs 14 based at least in part on the received representation of signal quality measurement data associated with the plurality of non-MBMS UEs (Block S102). For example, processor 32 generates an average signal quality metric of at least one, i.e., one or more, MBMS UE 14 based at least in part on the received representation of signal quality measurement data associated with the plurality of non-MBMS UEs 16. The combined signal quality measurement data may be an average SINR value, an interference level metric and the like. For example, processor 32 determines an average SINR value of the plurality of MBMS UEs based on the representation of signal quality measurement data or raw measurement report data from non-MBMS UEs. In one embodiment, a determination of the combined signal quality data includes estimating a downlink Channel Quality Indicator (CQI) of the at least one MBMS UE 14 based at least in part on the received representation of signal quality measurement data associated with the plurality of non-MBMS UEs 16. In generating the average signal quality metric, processor 32 may be configured to consider a combined signal quality data of the received representation of signal quality measurement data from the plurality of network nodes within the geographical area as a useful signal, and a combined signal quality data of the received representation of signal quality measurement data from the plurality of network nodes outside the geographical area as a interfering signal.

Therefore, the process of FIG. 4 and the process of some embodiments described herein may address the two problems with computing SINR at MBMS UE 14 that were previously described in connection with Equation (7). The first problem relates to the assumption that the transmissions from various cell sites are coherently combined to obtain the diversity gain, and the second problem relates to the fact that there is no RSRP measurement feedback from a MBMS UE.

The first problem is addressed by taking advantage of the fact that UEs do not distinguish transmissions within the MBSFN. Therefore, from a mathematical standpoint to show the benefit of this fact, Equation 7, described above as $$\left( \overline{\gamma}_m = \frac{\sum_{i=0}^{N-1} \rho_{i \to m}^M}{\sum_{i=N}^{L-1} \rho_{i \to m}^M + N_{0m}} \right)$$

is modified as follows:

$$\bar{\gamma}_m = E\left[\frac{\left|\sum_{\ell=0}^{d-1} P_\ell \left|\sum_{i=0}^{N-1} \sqrt{\rho_{i\to m}^M} h_{im}(\ell) \sum_{\ell=0}^{d-1} h_{im}(\ell)\right|^2\right|}{\left|\sum_{i=N}^{L-1} \sqrt{\rho_{i\to m}^M} \sum_{\ell=0}^{d-1} h_{im}(\ell)\right|^2 + N_{0m}}\right] \quad \text{(Eq. 8)}$$

where d represents the channel's root-mean-square (rms) delay spread in terms of the time units. A measure of expected dispersion can be obtained as part of the UE feedback measurements or the Uplink (UL) channel measurements. In particular, Eq. 8 is an improvement over Eq. 7 as Eq. 7 assumes that the transmissions from each network node 12 within the MBSFN area are combined in-phase. Eq. 8 gives a better indication of performance than Eq. 7 since UEs cannot distinguish the individual signals, and therefore it is not possible to combine transmission from each network node 12 in-phase. As such, Eq. 8 provides better estimation accuracy than Eq. 7. The equation can be further simplified if the channel is predominantly frequency flat as follows:

$$\bar{\gamma}_m = E\left[\frac{\left|\sum_{i=0}^{N-1} \sqrt{\rho_{i\to m}^M} h_{im}\right|^2}{\left|\sum_{i=N}^{L-1} \sqrt{\rho_{i\to m}^M} h_{im}\right|^2 + N_{0m}}\right] \quad \text{(Eq. 9)}$$

$\{h_{im}\}$ may be represented by a zero-mean, unit variance i.i.d. complex Gaussian random variables. Further, network nodes 12 within or adjacent to the MBSFN area, which are not taking part in the MBMS transmission, i.e., reserved cell sites, may mute the subframes which are used by the surrounding cell sites for MBMS transmissions. Therefore, the above equation (Eq. 9) can be simplified as follows:

$$\bar{\gamma}_m = E\left[\frac{\left|\sum_{i=0}^{N-1} \sqrt{\rho_{i\to m}^M} \sum_{\ell=0}^{d-1} h_{im}(\ell)\right|^2}{N_{0m}}\right] \quad \text{(Eq. 10)}$$

$$\bar{\gamma}_m = E\frac{\left|\sum_{i=0}^{N-1} \sqrt{\rho_{i\to m}^M} h_{im}\right|^2}{N_{0m}} \quad \text{(Eq. 11)}$$

where $\rho_{i\to m}$ is the RSRP measured at MBMS UE 14 with respect to the ith cell site. $N_{0m}$ is the thermal noise power for the UE-m. $h_{im}$ is channel weight between the UE-m and cell site-i. Therefore, the first problem is addressed by implementing the above equation for determining the combined signal quality measurement data for MBMS UEs 14 (Eq. 11).

The second problem, namely, that there is no RSRP measurement feedback from a MBMS UE 14, is addressed by determining an average channel quality metric, e.g., SINR, for MBMS UEs 14 based on representation of signal quality measurement data associated with non-MBMS UEs 16. In one embodiment, the average channel quality metric is average SINR, as described above with respect to Block S102. For example, for MBMS UEs 14 to successfully receive the broadcast/multicast content with minimum required QoS, the following conditions should be satisfied:

$\bar{\gamma}_m \geq \Gamma$ or $m = 0, 1, \ldots, N_M - 1$ where $\Gamma$ is the predefined minimum channel quality metric value, e.g., SINR value, for MBMS UE 14 to successfully receive the MBMS content with minimum required QoS. To determine the average channel quality metric, e.g., SINR, for MBMS UEs 14, the RSRP reports from UEs 16, i.e., non-MBMS UEs, are used in the following way:

$$\bar{\gamma} = \min\left\{E\left[\frac{\left|\sum_{i=0}^{N-1} \sqrt{\alpha_i \rho_{i\to u}} \sum_{\ell=0}^{d-1} h_{iu}(\ell)\right|^2}{N_0}\right] \forall (u, i)\right\} \quad \text{(Eq. 12)}$$

where $\rho_{i\to u}$ is the RSRP reported by the uth non-MBMS UE 16. $\alpha_i$ is the scaling factor representing the power difference between the MBMS and non-MBMS transmissions and is defined as:

$$\alpha_i = \frac{P_i^M}{P_i}$$

Therefore, in terms of implementation, in one embodiment, processor 32 determines the combined signal quality data, e.g., average SINR value, of MBMS UEs 14 using Eq. 12. The average SINR value across all the cell sites and the non-MBMS UEs within the MBSFN area is used to determine the MCS value for MBMS service such that MBMS UEs 14 within the MBSFN area can receive MBMS service meeting a predefined QoS, as discussed in detail with respect to FIG. 5.

Figure 5:
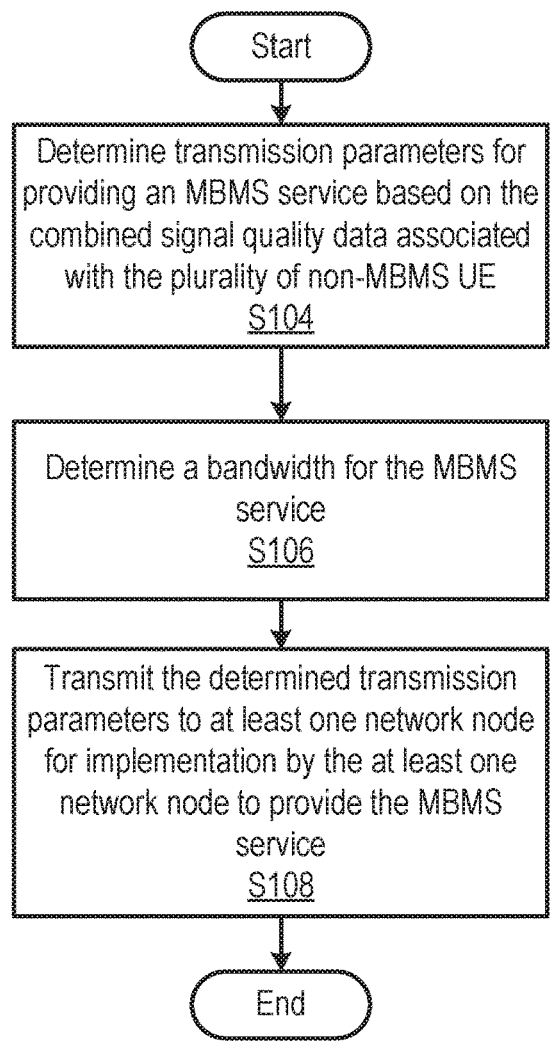
FIG. 5 is a signaling flow diagram of an exemplary process for determining transmission parameters in accordance with the principles of the disclosure.

An exemplary process of transmission parameter module 24 for determining MBMS transmission parameters for providing one or more MBMS service(s) within an MBSFN area is discussed with reference to FIG. 5. Processor 32 determines MBMS transmission parameters, e.g., MCS, for providing an MBMS service based on the combined signal quality data associated with the plurality of non-MBMS UE 16 (Block S104). For example, processor 32 maps the generated average signal quality metric of at least one MBMS UE 14 to a predetermined physical layer performance value to determine the MCS for providing the MBMS service. In one embodiment, processor 32 maps the average SINR value determined in Block S102 to one or more physical layer performance curves or tables to determine the MCS. For example, the MCS is determined based on the average SINR (Eq. 12) to Block Error Ratio (BLER) rate tables.

The physical layer performance curve or tables may be selected for the mapping based on one or more factors such as QoS requirement for MBMS service, type of MBMS service and usage model. The usage model takes into consideration the mobility of UEs. For example, if a MBMS service is targeted for stationary users, the physical layer performance curves for low speed are used to derive the MCS via the mapping.

Processor 32 determines a bandwidth for the MBMS service (Block S106). In one embodiment, processor 32 determines required radio resource(s) for MBMS service based on the determined MCS. The radio resources may include sub-frames, radio blocks, etc. The determined required radio resources and MCS are selected, i.e., configured, to satisfy a Quality of Service, QoS, requirement for an MBMS service.

After the determination of bandwidth has been made, processor 32 causes communication interface 30 to transmit the determined transmission parameters, e.g., MCS to at least one network node 12 for implementation by the at least one network node 12 to provide the MBMS service (Block S108). For example, processor 32 causes communication interface 30 to transmit an MBSFN subframe configuration with the determined MCS to network nodes 12 within the MBSFN for implementation in providing MBMS service(s). According to one embodiment of the disclosure, network node 12 acting as a central network node, transmits radio resources for MBMS services and other transmission parameters to other network nodes 12 within the MBSFN area via the X2 interface.

In one embodiment, a coverage area for the providing MBMS service can be determined. An exemplary process performed by service area module 26 for determining a coverage area for providing MBMS service is discussed with respect to FIG. 6. Processor 32 determines at least one cell site within the geographical region that is to implement an MCS for providing an MBMS service (Block S110). In one embodiment, network node 12 may provide a cell or coverage area as illustrated in FIG. 2. In another embodiment, network node 12 may provide or support multiple cells or coverage areas. For example, the MBSFN area can be started initially with one cell within one propagation area, e.g., an urban area such that the determination of Block 110 is the single cell.

Processor 32 determines at least one neighbor cell within the geographical area to temporarily add to the MBMS coverage area (Block S112). After performing the determination of Block S112, processor 32 calculates the MCS for the MBMS coverage area (Block S114). Processor 32 subsequently computes the radio resources required for the MBMS service with the derived MCS and the required QoS for the MBMS service. Processor 32 further computes the overall spectral efficiency of the carrier frequency, considering the MBMS service, the need to support unicast traffic and any other MBMS service already support on the same carrier frequency. After performing the calculation of Block S114, processor 32 determines whether a higher spectral efficiency is achieved due to the addition of the new network node 12 to the MBSFN area than the spectral efficiency achieved without new network node 12 (Block S116). In one embodiment, processor 32 determines whether the MCS with the added neighbor cell causes the spectral efficiency to drop below a predefined threshold.

Figure 6:
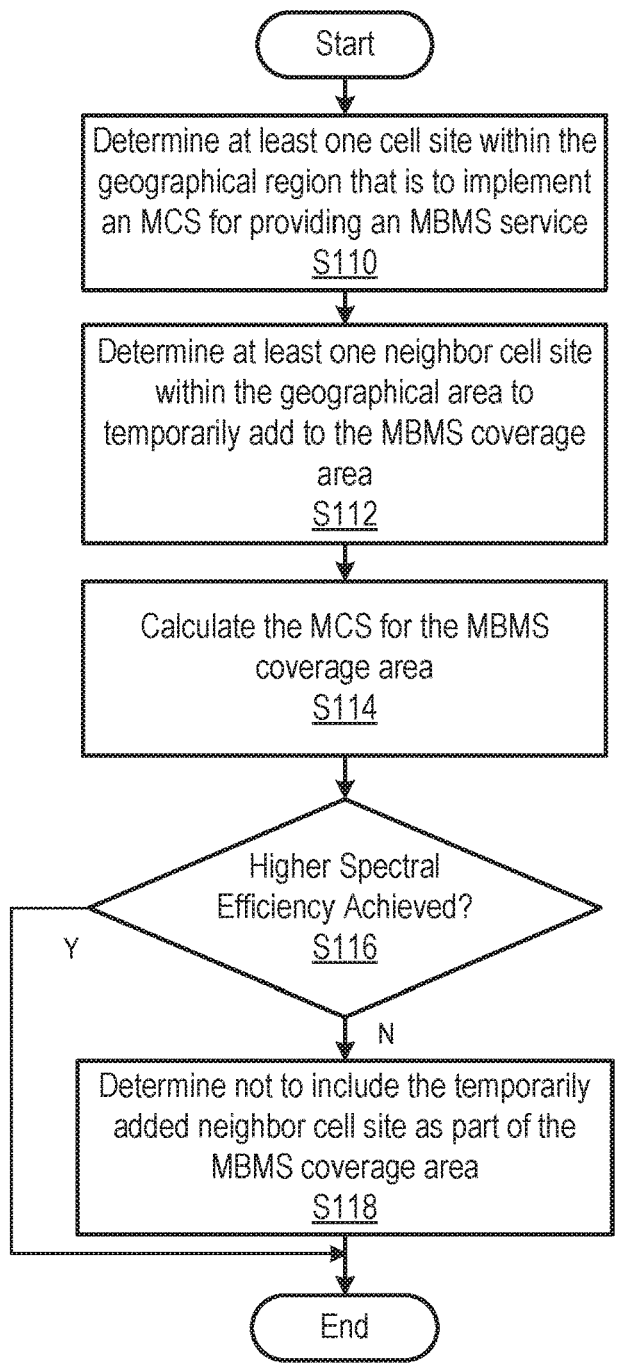
FIG. 6 is a signaling flow diagram of an exemplary process for determining MBSFN areas in accordance with the principles of the disclosure.

If the determination is made that there is not an increase in spectral efficiency due to the addition of the of the new node or that the increase in spectral efficiency is not greater than a predefined amount, processor 32 determines not to include the temporarily added neighbor cell as part of the MBMS coverage area (Block S118). If the determination is made that the predetermined transmission characteristic is met, the temporarily added neighbor cell remains part of the MBMS coverage area. In other words, the overall spectral efficiency to support the MBMS service over a coverage area can be split into multiple MBSFN areas, where the processes of FIG. 6 are performed for each area. For example, the coverage area is composed of terrains with different propagation characteristics or different environment, such as, urban, suburban, rural etc., different types of traffic, low speed, medium speed or high speed etc. The service area process described above advantageously separates the different types of propagation environments in different MBMS coverage areas to provide improved spectrally efficiency. Further, the determination of the MBSFN area for MBMS service provides a reduction in a predefined QoS requirement for the MBMS service. In one embodiment, the number of reserved cell sites surrounding each MBSFN area can also be decided based on the RSRP measurement feedback from the non-MBMS UEs 16. These reserved cell sites do not reduce the coverage of the MBMS services within the MBMS coverage area.

The process of FIG. 6 can also be performed to determine the reserved cell sites surrounding a MBSFN area. If more cell sites outside the MBSFN area are configured as reserved cell sites, i.e. the transmission on the MBSFN subframes is muted in the reserved cell sites, the interference is contained to a greater extent. This will further improve the MCS used for the MBMS transmission in the MBSFN area. However, the spectral efficiency of the surrounding cell sites may drop due to muted radio resources. Therefore, a process similar to FIG. 6 can be used to select a minimum number of reserved cell sites to achieve the best average network spectral efficiency.

Figure 7:
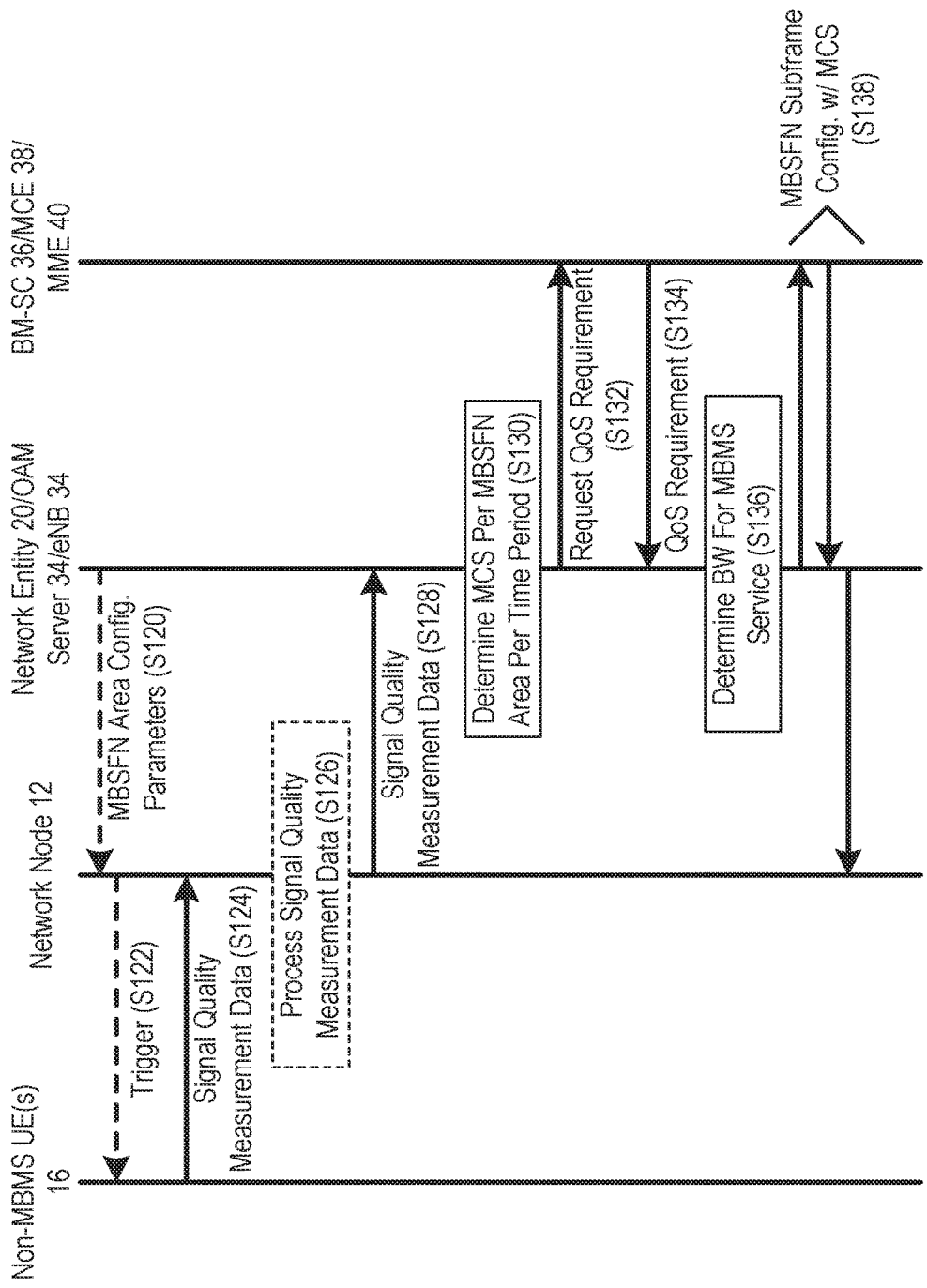
FIG. 7 is a signaling diagram of an exemplary process for configuring transmission parameters for providing MBMS service in accordance with the principles of the disclosure.
Figure 8:
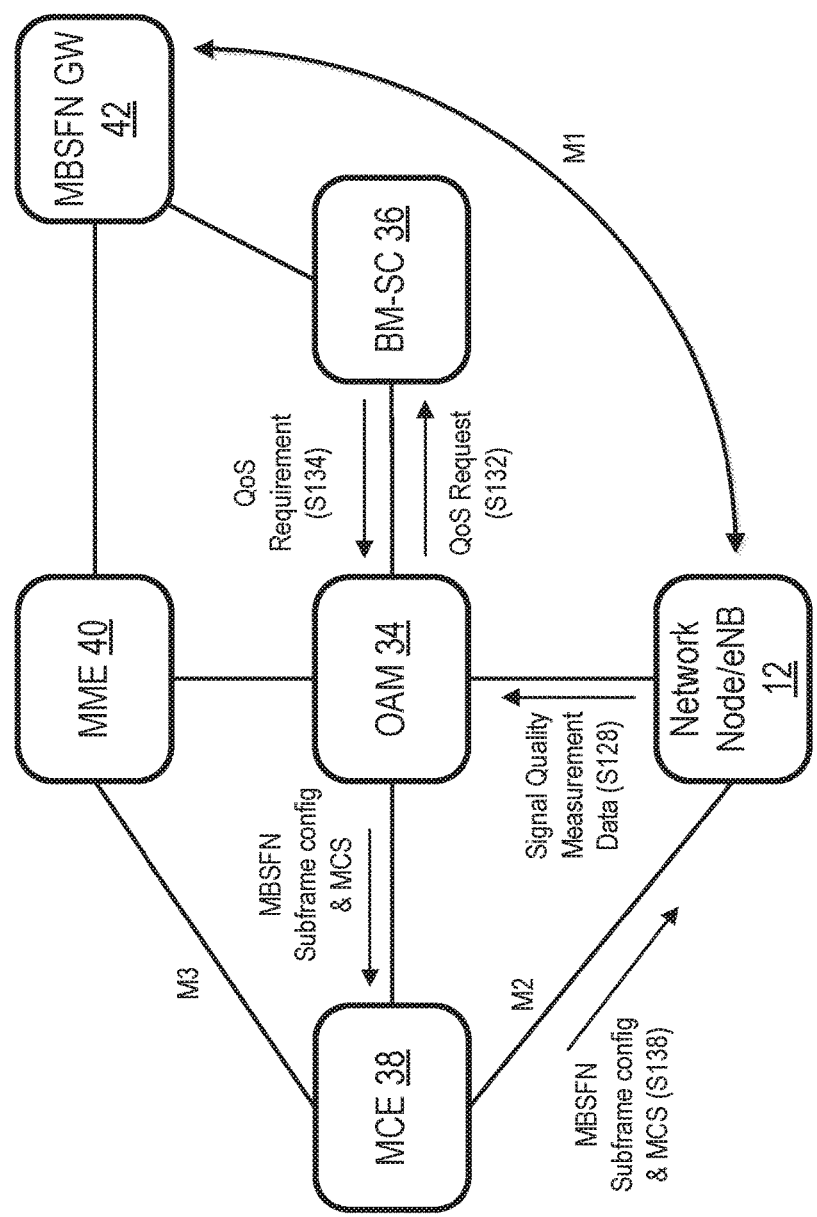
FIG. 8 is an alternative view of the signaling diagram of FIG. 7 in accordance with the principles of the disclosure.

A more detailed process for determining transmission parameters for providing MBMS service(s) in an MBSFN area using the various network components discussed herein is described with respect to FIG. 7. In particular, the process described with respect to FIG. 7 advantageously provides MBMS MCS configuration without changing the general architecture of the general aspects and principles for interfaces support Multimedia Broadcast Multicast Service (MBMS) within Evolved Universal Terrestrial Access Network (E-UTRAN) as described in 3GPP TS 36.440 and as illustrated in FIG. 8. Network entity 20, e.g., Operation, Administration and Maintenance (OAM) server or eNB, transmits MBSFN Area configuration parameters (S120). For example, the MBSFN area configuration parameters may be based previously received signal quality measurement data as described with respect to FIG. 6. One or more network nodes 12 transmit a trigger, i.e., measurement report trigger, to non-MBMS UEs 16 serviced by network nodes 12 (Block S122). In one embodiment, processor 32 of network entity 20 acting as a network node 12 is configured to cause communication interface 30 to send a trigger to the plurality of non-MBMS UEs 16 to report the representation of signal quality measurement data to communication interface 30. In another embodiment, processor 32 is configured to cause communication interface 30 to transmit a message to at least one of the plurality of network nodes 12 in which the message is configured to cause the at least one of the plurality of network nodes 12 to send a trigger to at least one non-MBMS UEs 16 associated with the at least one of the plurality of network nodes 12 to report the representation of signal quality measurement data.

In one embodiment, the trigger is Radio Resource Control (RRC) Connection Reconfiguration message indicating an event in which the RRC Connection Reconfiguration message is transmitted to connected non-MBMS UEs 16 within the MBSFN area defined by MBSFN area configuration parameters. The type of measurement to be performed and number of neighbors for measurement reporting may be indicated in the trigger. For example, the measurement report trigger indicates whether to performed an RSRP or RSRQ type measurement. Further, processor 32 may be configured to select non-MBMS UEs 16 that are to receive the trigger based at least in part on a location of the respective non-MBMS UEs 16 within geographical area 18.

In response to receiving the trigger, non-MBMS UEs 16 generate and transmit signal quality measurement data to respective network nodes 12 (Block S124). In one embodiment discussed above, non-MBMS UEs 16 perform the type of measurement indicated in trigger, e.g., RSRP or RSRQ type measurement. The signal quality measurement data may be in the form of raw measurement data or a compressed representation of the measurement data. Network node 12 processes the received signal quality measurement data (Block S126). For example, network node 12 may calculate the channel quality metric, e.g., SINR or histogram of SINRs, for each MBMS UEs 14 based on the received signal quality measurement data associated with non-MBMS UEs 16, i.e., network node 12 performs the functions of signal quality module 22. In one embodiment, network node 12 may forward the signal quality measurement data received from non-MBMS UEs 16 without processing the data to determine a channel quality metric for MBMS UEs 14, i.e., Block S126 is skipped.

After processing the signal quality measurement data, network node 12 transmits the signal quality measurement data, e.g., a representation of measurement data or raw measurement data, along with corresponding time stamp data to network entity 20 (Block S128). Network entity 20 receives the signal quality measurement data from network node 12, and determines an MCS per MBSFN area per time period based on the received signal quality measurement data (Block S130). For example, network entity 20 performs the process of Block S104. In one embodiment, network entity 20 also performs the functions of signal quality module 22 to calculate the channel quality metric for MBMS UEs 14 based on signal quality measurement data received from non-MBMS UEs 16.

In other words, network nodes 12 collect signal quality measurement data such as measurement reports, e.g., full RSRP reports or compressed reports, from non-MBMS UEs 16 that are connected to network nodes for unicast services. The signal quality measurement data is then transmitted over time to network entity 20 for processing. In one embodiment, network node 20 may include the RSRP report of the serving cell site and the RSRPs of neighboring cell sites if the RSRP with respect to the neighboring cell sites is within a predefined amount, e.g. 6 dB, of the RSRP with respect to the serving cell site. In another embodiment, network node 12 may select all the RSRP values from each non-MBMS UE 16 which are n-dB of each other. Then the channel quality metric may be calculated using these RSRP values.

After, determining an MCS per MBSFN area per time period, network entity 20 requests QoS requirements based on the calculated MCS (Block S132). In one embodiment, network entity 20 requests the QoS requirements from Broadcast Multicast Service Center (BM-SC) 36. After requesting the QoS requirements, network entity 20 receives the QoS requirements and determines the required bandwidth for providing MBMS service (Blocks S134-S136). Alternatively, the determination of the required bandwidth may be performed at MCE 38.

After performing the determining of Block S136, network entity 20 determines an MBSFN subframe configuration based on the required bandwidth, and transmits the MBSFN subframe configuration with the MCS value to all network nodes 12 within the MBSFN area for implementation in providing the MBMS service to MBMS UEs 14 (Block S138). As discussed above, the method addresses the problems with existing systems and does so without requiring a change to the general architecture of existing communication standards.

An exemplary signaling diagram of elements described in FIG. 7 is discussed with respect to FIG. 8. In particular, the processes illustrated in FIG. 8 advantageously provides MBMS MCS configuration without changes to the existing communication standards such as 3GPP TS 36.440 that relate to the general aspects and principles for support MBMS within E-UTRAN. The general architecture includes Operation, Administration and Maintenance (OAM) 34. Broadcast Multicast Service Centre (BM-SC) 36, MBMS Coordination Entity (MCE) 38, Mobility Management Entity (MME) 40 and Multicast Broadcast Single Frequency Network GateWay (MBSFN GW) 42, and several interfaces. For example, the M1 interface is a user plane interface that carries signaling between eNB 12, i.e., network node 12, and MBSFN GW 42. The M2 interface is a control plane interface that carries signaling between eNB 12 and MCE 38 such as MBSFN subframe configuration and MCS. The M3 interface is a control plane interface that carries signaling between MCE 38 and MME 40 such as MBSFN subframe configuration, MCS and/or QoS data.

Figure 9:
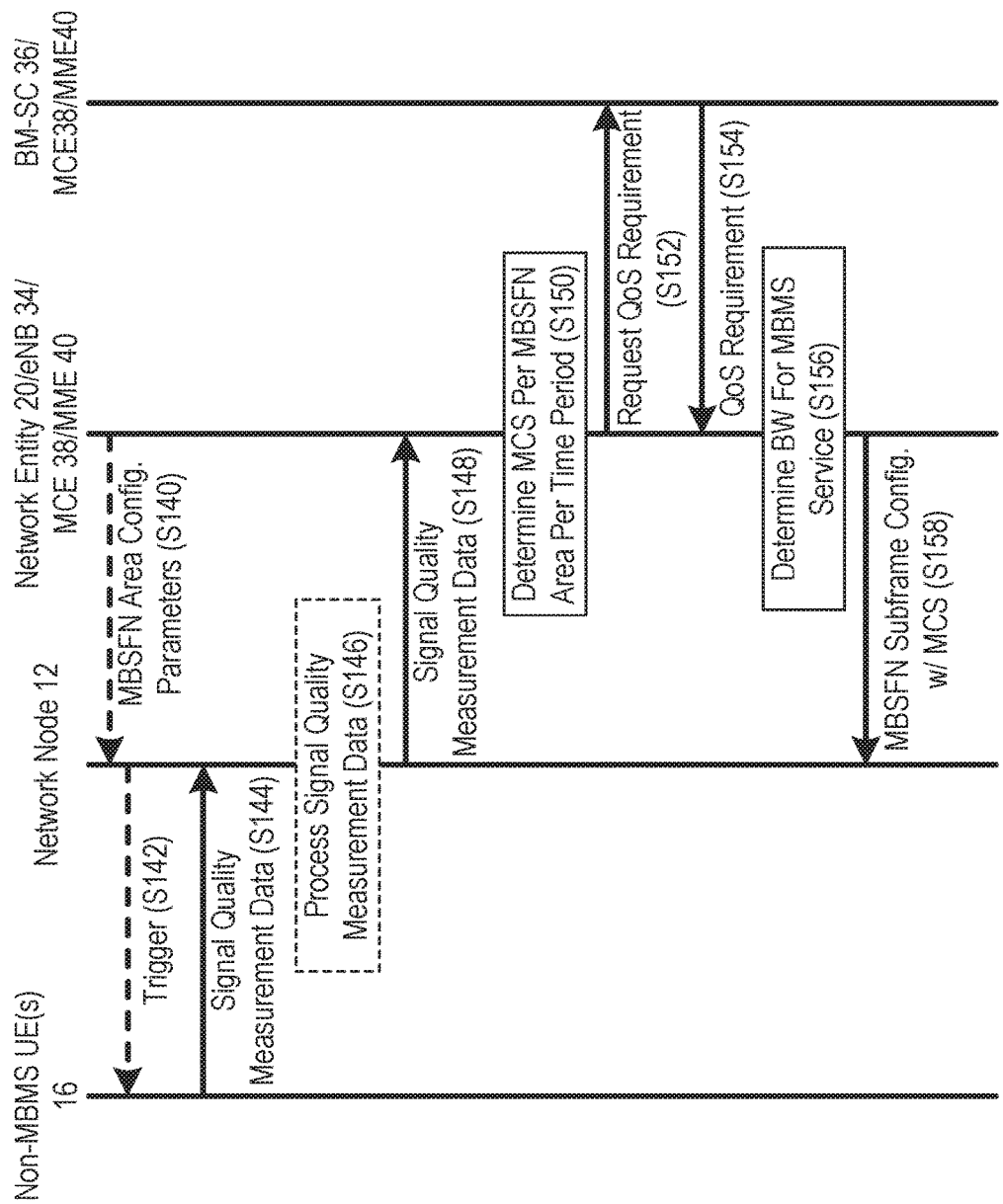
FIG. 9 is a signaling diagram of another exemplary process for configuring transmission parameters for providing MBMS service in accordance with the principles of the disclosure.

An alternative process for configuring one or more MBSFN areas and transmission parameters for providing MBMS service(s) in the one or more MBSFN areas is illustrated in FIG. 9. The signaling processes illustrated in FIG. 9 modifies the general architecture of FIG. 8, i.e., modifies existing communication standards, as MCE 38 has been modified to perform OAM 34 functions such as calculating MCS and performing QoS queries, among other changes to the general architecture.

Network entity 20 transmits MBSFN Area configuration parameters to one or more network nodes 12 as described with respect to Block S140 (which has similar functionality to Block S120). After performing the process of Block S140, network node 12, e.g., eNB, transmits a trigger, i.e., measurement report trigger, to non-MBMS UEs 16 serviced by network node 12 as described with respect to Block S142 (which has similar functionality to Block S122). In response to receiving the trigger, non-MBMS UEs 16 generate and transmit signal quality measurement data as described with respect to Block S144 (which has similar functionality to Block S124). Network node 12 processes the received signal quality measurement data as described with respect to Block S146 (which has similar functionality to Block S126). In one embodiment, Block S146 may be skipped such that processing of the signal quality measurement data takes place in at the network entity 20.

After performing the process of Block S146, network node 12 transmits the signal quality measurement data, e.g., a representation of the data or raw data, along with corresponding time stamp data to network entity 20 as described with respect to Block S148 (which has similar functionality to Block S128). Network entity 20 receives the signal quality measurement data from network node 12, and determines an MCS per MBSFN area per time period based on the received signal quality measurement data as described with respect to Block S150 (which has similar functionality to Block S130). Network entity 20, e.g., MCE 38, requests QoS requirements based on the calculated MCS (Block S152). In one embodiment, MCE 38 requests the QoS requirements from BM-SC 36 via MME 40 and MBSFN GW 42. After performing the request of Block S152, network entity 20, e.g., MCE 38, receives the QoS requirements (Block S154). MCE 38 determines an MBSFN subframe configuration based on the required bandwidth, and transmits the MBSFN subframe configuration with the MCS value to all network nodes 12 within the MBSFN area for implementation in providing the MBMS service (Block S158).

Figure 10:
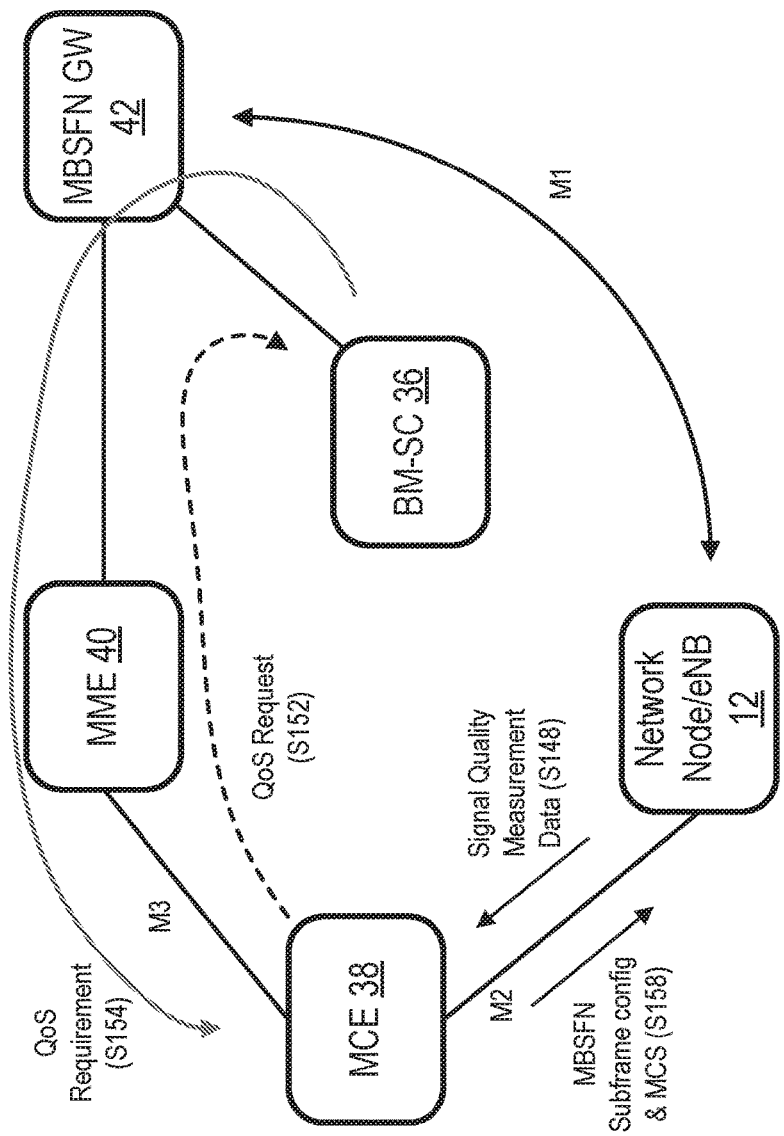
FIG. 10 is an alternative view of the signaling diagram of FIG. 9 in accordance with the principles of the disclosure.

An exemplary signaling diagram of elements described in FIG. 9 is described with respect to FIG. 10. In particular, the processes illustrated in FIG. 10 advantageously provides an MCE 38 for performing MBMS MCS configuration. The general architecture includes BM-SC 36, MCE 38, MME 40, MBSFN 42 and several interfaces. MCE 38 is configured to perform the MCS determination, QoS requirement request and MBSFN subframe configuration, similar to OAM 34 in the embodiment of FIG. 8.

The processes described in FIG. 9 and FIG. 10 require changes to the existing M2 interface described in 3GPP TS 36.443. As described herein, when the interfaces are modified according to the proposed embodiments of the disclosure, the signaling delay can be reduced compared to the method described in FIG. 7 and FIG. 8, thereby helping expedite the setup of MBSFN areas, transmission parameters etc.

Furthermore, the updated standards without modification to the interfaces, as discussed in the disclosure, will also allow the operator to implement the functionality described in the disclosure across multi-vendor equipment. On the other hand, a proprietary solution that modifies the interfaces, as described in the disclosure, may give an operator the flexibility to globally optimize the various services deployed across the network and the carrier frequencies.

Figure 11:
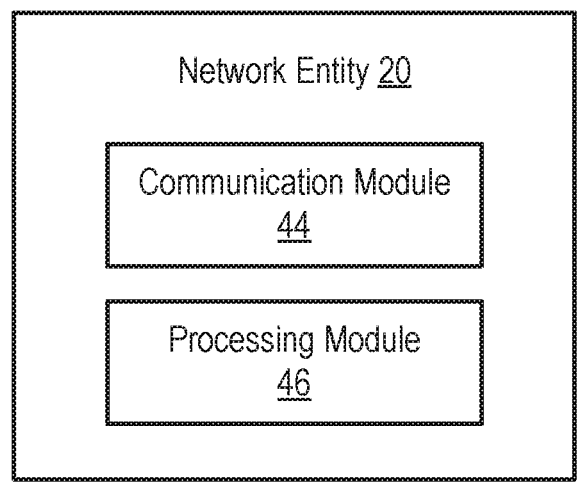
FIG. 11 is an exemplary alternative embodiment of network entity in accordance with the principles of the disclosure.

An alternative embodiment of network entity 20 is discussed with respect to FIG. 11. Network entity 20 includes a communication module 44 that is configured to receive a representation of signal quality measurement data associated with a plurality of non-MBMS UEs 16. Each non-MBMS UE 16 is served by at least one of the plurality network nodes 12. Network entity 20 further includes processing module 46 that is in communication with communication module 44. Processing module 46 is configured to determine a combined signal quality data of a plurality of MBMS UEs 14 based at least in part on the received representation of signal quality measurement data associated with the plurality of non-MBMS UEs 16. Processing module 46 may be further configured to perform one or more functions of transmission parameters module 24 and service area module 26.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A network entity in communication with a plurality of network nodes within a geographical area, the network entity comprising:
   a communication interface configured to receive a representation of signal quality measurement data that is based on measurements performed by a plurality of non-Multimedia Broadcast Multicast Service user equipments (non-MBMS UEs) of transmissions from the plurality network nodes; and
   a processor communicatively coupled to the communication interface, the processor configured to:
   generate an average signal quality metric of a plurality of MBMS UEs based at least in part on the received representation of signal quality measurement data that is based on measurements performed by the plurality of non-MBMS UEs of transmissions from the plurality of network nodes,
   wherein generating the average signal quality metric includes:
   considering a combined signal quality data of the received representation of signal quality measurement data from the plurality of network nodes within the geographical area as a useful signal; and
   considering a combined signal quality data of the received representation of signal quality measurement data from the plurality of network nodes outside the geographical area as an interfering signal,
   wherein the processor is further configured to determine a Modulation and Coding Scheme, MCS, for providing an MBMS service based on the combined signal quality data associated with the plurality of non-MBMS UE.

2. The network entity of claim 1, wherein the processor is further configured to cause the communication interface to transmit the determined MCS to at least one network node for implementation by the at least one network node to provide the MBMS service.

3. The network entity of claim 1, wherein the processor is further configured to determine a required radio resource for MBMS service based on the determined MCS.

4. The network entity of claim 3, wherein the determined required radio resource and MCS are configured to satisfy a Quality of Service, QoS, requirement for an MBMS service.

5. The network entity of claim 1, wherein the processor is further configured to cause the communication interface to send a trigger to the plurality of non-MBMS UEs to report the representation of signal quality measurement data to the communication interface.

6. The network entity of claim 5, wherein the processor is further configured to select non-MBMS UEs that are to receive the trigger based at least in part on a location of the respective non-MBMS UEs within the geographical area.

7. The network entity of claim 5, wherein the processor is further configured to cause the communication interface to transmit a message to at least one of the plurality of network nodes, the message configured to cause the at least one of the plurality of network nodes to send a trigger to at least one non-MBMS UEs associated with the at least one of the plurality of network nodes to report the representation of signal quality measurement data.

8. The network entity of claim 5, wherein the trigger is a Radio Resource Control Connection Reconfiguration message.

9. The network entity of claim 8, wherein the representation of signal quality with respect to a serving cell site and at least one neighbor cell site from the plurality of network nodes.

10. The network entity of claim 1, wherein the processor is further configured to determine at least one Multicast Broadcast Single Frequency Network, MBSFN, coverage area for providing an MBMS service based at least in part on the received representation of signal quality measurement data that is based on measurements performed by the plurality of non-MBMS UEs of transmissions from the plurality of network nodes.

11. The network entity of claim 10, wherein a determination of the MBSFN area for MBMS service a reduction of the required radio resources to satisfy a predefined QoS requirement for the MBMS service.

12. The network entity of claim 1, wherein the processor is further configured to determine a plurality of reserved cell sites of the MBSFN area.

13. The network entity of claim 12, wherein the determination of the reserved cell sites is based on an interference level experience by the MBMS UEs within the MBSFN area.

14. The network entity of claim 12, wherein the determination of the reserved cell sites is based on the number of radio resources muted in the reserved cell sites.

15. The network entity of claim 1, wherein the processor is further configured to determine a Modulation and Coding Scheme, MCS, for providing the MBMS service, in part, by generating an average signal quality metric of at least one MBMS UE based at least in part on the received representation of signal quality measurement data that is based on measurements performed by the plurality of non-MBMS UEs of transmissions from the plurality of network nodes.

16. The network entity of claim 15, wherein the processor is further configured to determine a Modulation and Coding Scheme, MCS, for providing the MBMS service, in part, by:
    mapping the generated average signal quality metric of the at least one MBMS UE to a predetermined physical layer performance value to determine the MCS for providing the MBMS service; and
    selecting an MCS from the determined MCS values which provides MBMS service with acceptable QoS to all the MBMS UEs within the MBSFN area.

17. The network entity of claim 15, wherein the average signal quality metric is one of a signal-to-interference plus noise ratio, SINR, metric and interference level metric.

18. The network entity of claim 15, wherein the selecting of the MCS from the determined MCS values includes selecting the MCS corresponding to the lowest average signal quality metric from all the compound average signal quality metric from the measurement reports received from the network nodes within the MBSFN area.

19. The network entity of claim 1, wherein the network entity is one of an MBMS Coordination Entity, MCE, an Operation, Administration and Maintenance, OAM, entity and a network node.

20. The network entity of claim 1, wherein the network entity is distributed over a plurality of physical entities.

21. A method for determining combined signal quality data, the method comprising:
    receiving, at a network entity, a representation of signal quality measurement data that is based on measurements performed by a plurality of non-Multimedia Broadcast Multicast Service user equipments (non-MBMS UEs) of transmissions from of a plurality network nodes; and
    generating an average signal quality metric based at least in part on the received representation of signal quality measurement data that is based on measurements performed by the plurality of non-MBMS UEs of transmissions from the plurality of network nodes, wherein generating the average signal quality metric includes:
    considering a combined signal quality data of the received representation of signal quality measurement data from the plurality of network nodes within the geographical area as a useful signal;
    considering a combined signal quality data of the received representation of signal quality measurement data from the plurality of network nodes outside the geographical area as an interfering signal; and
    determining a Modulation and Coding Scheme, MCS, for providing an MBMS service based on the combined signal quality data that is based on measurements performed by the plurality of non-MBMS UEs of transmissions from the plurality of network nodes.

22. The method of claim 21, further comprising transmitting the determined MCS to at least one network node for implementation by the at least one network node to provide the MBMS service.

23. The method of claim 21, further comprising determining a required radio resource for MBMS service based on the determined MCS.

24. The method of claim 23, wherein the determined required radio resource and MCS being configured to satisfy a Quality of Service, QoS, requirement for an MBMS service.

25. The method of claim 21, wherein a determination of the combined signal quality data includes estimating a downlink Channel Quality Indicator, CQI, of at least one MBMS UE based at least in part on the received representation of signal quality measurement data that is based on measurements performed by the plurality of non-MBMS UEs of transmissions from the plurality of network nodes.

26. The method of claim 21, further comprising sending a trigger to the plurality of non-MBMS UEs to report the representation of signal quality measurement data.

27. The method of claim 26, further comprising selecting non-MBMS UEs that are to receive the trigger based at least in part on a location of the respective non-MBMS UEs within the geographical area.

28. The method of claim 26, further comprising transmitting a message to at least one of the plurality of network nodes, the message configured to cause the at least one of the plurality of network nodes to send a trigger to at least one non-MBMS UEs associated with the at least one of the plurality of network nodes to report the representation of signal quality measurement data.

29. The method of claim 26, wherein the trigger is a Radio Resource Control Connection Reconfiguration message.

30. The method of claim 29, wherein the representation of signal quality measurement data consists of received signal qualities with respect to a serving cell site and at least one neighbor cell site from the plurality of network nodes.

31. The method of claim 21, further comprising determining at least one Multicast Broadcast Single Frequency Network, MBSFN, coverage area for providing an MBMS service based at least in part on the received representation of signal quality measurement data that is based on measurements performed by the plurality of non-MBMS UEs of transmissions from the plurality of network nodes.

32. The method of claim 31, wherein a determination of the MBSFN area for MBMS service a reduction of the required radio resources to satisfy a predefined QoS requirement for the MBMS service.

33. The method of claim 21, further comprising determining a plurality of reserved cell sites of the MBSFN area.

34. The method of claim 33, wherein the determination of the reserved cell sites is based on the interference level experienced by the MBMS UEs within the MBSFN area.

35. The method of 33, wherein the determination of the reserved cell sites is based on the number radio resources muted in the reserved cell sites.

36. The method of claim 21, further comprising determining a Modulation and Coding Scheme, MCS, for providing the MBMS service, in part, by generating an average signal quality metric of at least one MBMS UE based at least in part on the received representation of signal quality measurement data that is based on measurements performed by the plurality of non-MBMS UEs of transmissions from the plurality of network nodes.

37. The method of claim 36, further comprising determining a Modulation and Coding Scheme, MCS, for providing the MBMS service, in part, by:
  mapping the generated average signal quality metric of the at least one MBMS UE to a predetermined physical layer performance value to determine the MCS for providing the MBMS service; and
  selecting an MCS from the determined MCS values which provides MBMS service with acceptable QoS to all the MBMS UEs within the MBSFN area.

38. The method of claim 36, wherein the average signal quality metric is one of a signal-to-interference plus noise ratio, SINR, metric and interference level metric.

39. The method of claim 36, wherein the selecting of the MCS from the determined MCS values comprises selecting the MCS corresponding to the lowest average signal quality metric from all the computed average signal quality metric from the measurement reports received from the network nodes within the MBSFN area.

40. The method of claim 21, wherein the network entity is one of an MBMS Coordination Entity, MCE, an Operation, Administration and Maintenance, OAM, entity and a network node.

41. The method of claim 21, wherein the network entity is distributed over a plurality of physical entities.

42. A network entity in communication with a plurality of network nodes within a geographical area, the network entity comprising:
  a communication module configured to receive a representation of signal quality measurement data that is based on measurements performed by a plurality of non-Multimedia Broadcast Multicast Service user equipments (non-MBMS UEs) of transmissions from the plurality network nodes; and
  a processor module communicatively coupled to the communication interface, the processor module configured to:
  generate an average signal quality metric of a plurality of MBMS UEs based at least in part on the received representation of signal quality measurement data that is based on measurements performed by the plurality of non-MBMS UEs of transmissions from the plurality of network nodes, wherein generating the average signal quality metric includes:
  considering a combined signal quality data of the received representation of signal quality measurement data from the plurality of network nodes within the geographical area as a useful signal;
  considering a combined signal quality data of the received representation of signal quality measurement data from the plurality of network nodes outside the geographical area as an interfering signal; and
  determining a Modulation and Coding Scheme, MCS, for providing an MBMS service based on the combined signal quality data that is based on measurements performed by the plurality of non-MBMS UEs of transmissions from the plurality of network nodes.

* * * * *